(12) United States Patent
Sato (10) Patent No.: US 6,954,294 B2
(45) Date of Patent: Oct. 11, 2005

(54) TUNABLE FILTER, MANUFACTURING METHOD THEREOF AND OPTICAL SWITCHING DEVICE COMPRISING THE TUNABLE FILTER

(75) Inventor: Akinobu Sato, Tokyo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/984,985

(22) Filed: Nov. 10, 2004

(65) Prior Publication Data

US 2005/0094964 A1 May 5, 2005

Related U.S. Application Data

(62) Division of application No. 10/452,724, filed on Jun. 3, 2003, now Pat. No. 6,833,957.

(30) Foreign Application Priority Data

Jun. 4, 2002 (JP) ........................................ 2002/163645

(51) Int. Cl.[7] .................................................. G02B 5/28
(52) U.S. Cl. ......................... 359/88; 359/578; 359/587; 359/589; 359/590; 356/454
(58) Field of Search .............................. 385/8–10, 147; 359/578, 579, 587–590; 356/454

(56) References Cited

U.S. PATENT DOCUMENTS 4,825,262 A    4/1989    Mallinson
5,739,945 A    4/1998    Tayebati
2002/0167730 A1   11/2002   Needham et al.
2003/0031221 A1   2/2003    Wang et al.
2004/0075845 A1   4/2004    Chang
2004/0109250 A1 * 6/2004    Choi et al. .................. 359/883

FOREIGN PATENT DOCUMENTS

JP    11-142752 A    5/1999
JP    2001-221913 A  8/2001

* cited by examiner

*Primary Examiner*—Akm Enayet Ullah
*Assistant Examiner*—Kevin S. Wood
(74) *Attorney, Agent, or Firm*—Posz Law Group, PLC (57) ABSTRACT

The invention provides a tunable filter that can minimize adjacent channel cross talk despite an increase of a number of available wavelengths and quickly switch a wavelength to be used, and manufacturing method thereof, and also an optical switching device comprising such tunable filter. In a tunable filter having a Fabry-Perot etalon structure, not less than two cavity gaps 114 to 116 are provided and separation between the cavity gaps is controlled by any of electrostatic drive, electromagnetic drive or piezoelectric drive. In this case, the cavity gaps can be formed through the steps of forming a sacrificial layer in advance where a cavity gap is to be formed; forming a plurality of optical multilayer films 100 to 103; and removing the sacrificial layer by etching. Substrates 107 and 109 are combined through a supporting column 108.

2 Claims, 10 Drawing Sheets

```
100, 101, 102, 103 : optical multilayer film
104a, 104b, 104c, 104d : electrode
105a, 105b : electrode
106a, 106b : spring portion
107, 109 : substrate
108 : supporting column
110 : WDM light
111 : transmitted light beam
112 : reflected light
113 : spring portion
114, 115, 116 : cavity gap
```

FIG. 1

100, 101, 102, 103 : optical multilayer film
104a, 104b, 104c, 104d : electrode
105a, 105b : electrode
106a, 106b : spring portion
107, 109 : substrate
108 : supporting column
110 : WDM light
111 : transmitted light beam
112 : reflected light
113 : spring portion
114, 115, 116 : cavity gap

300, 301, 302, 303 : optical multilayer film
304a, 304b, 318 : electromagnet
305 : foundation layer
306a, 306b : spring portion
307, 309 : substrate
308 : supporting column
310 : WDM light
311 : transmitted light beam
312 : reflected light
313 : spring portion
314, 315, 316 : cavity gap
317, 319a, 319b : magnetic material

FIG. 4

304a : electromagnet

500, 501, 502, 503 : optical multilayer film
504a, 504b, 504c, 504d : electrode
505 : foundation layer
506a, 506b : spring portion
507, 509 : substrate
508 : supporting column
510 : WDM light
511 : transmitted light beam
512 : reflected light
513 : spring portion
514, 515, 516 : cavity gap
517 : magnetic material
518 : electromagnet

FIG. 6

100, 101, 102, 103 : optical multilayer film
104a, 104b, 104c, 104d : electrode
106a, 106b : spring portion
107, 109 : substrate
108 : supporting column
110 : WDM light
111 : transmitted light beam
112 : reflected light
113 : spring portion
114, 115, 116 : cavity gap
605 : piezoelectric device

FIG. 7

700 : substrate
701, 702, 703, 704 : optical multilayer film
705, 711, 712 : spring portion
706, 707, 713, 714, 715, 716 : electrode
708, 709, 710 : cavity gap

FIG 8.

100, 102, 103 : optical multilayer film
104a, 104b, 104c, 104d : electrode
105a, 105b : electrode
106a, 106b : spring portion
107, 109 : substrate
108 : supporting column
110 : WDM light
111 : transmitted light beam
112 : reflected light
113 : spring portion
114, 116 : cavity gap

FIG. 9

800 : tunable filter
801 : circulator
802 : coupler
803 : WDM optical signal
804 : drop port
805 : add port
806 : output port

FIG. 10

900 : WDM optical signal
901 : optical switch
902 : tunable filter
903 : drop port
904 : add port
905 : output port

FIG. 11

1001 : substrate
1002, 1003 : optical multilayer film
1004 : electrode
1005 : spring portion
1006 : cavity gap
1007 : WDM light
1008 : reflected light
1009 : transmitted light beam

TUNABLE FILTER, MANUFACTURING METHOD THEREOF AND OPTICAL SWITCHING DEVICE COMPRISING THE TUNABLE FILTER

This is a divisional of application Ser. No. 10/452,724 filed Jun. 3, 2003 now U.S. Pat. No. 6,833,957 the entire disclosure of which is considered part of the disclosure of the accompanying application and is hereby.

This application is based on Japanese patent application No. 2002-163645. the content of which is incorporated hereinto by reference.

BACKGROUND OF THE INVENTION

1. Field of the Invention

The present invention relates to a tunable filter to be used when selecting from, eliminating out of, or adding to a wavelength division multiplex optical signal a particular wavelength, mainly in an optical communication network in which wavelength division multiplexing is employed, and manufacturing method thereof, and further to an optical switching device comprising such tunable filter.

2. Description of the Related Art

Recently, wavelength division multiplexing has come to be popularly used in a field of optical communication, making it more and more important to select and pick up a particular wavelength out of a wavelength division multiplex (hereinafter referred to as "WDM") optical signal. An optical add/drop device and an optical cross-connect device, which are currently available in the market, are generally designed to select a fixed wavelength out of a WDM optical signal. In such fixed wavelength filters, generally a Fabry-Perot etalon filter comprising a dielectric multi-layer film is incorporated because of its excellent cost performance.

Also, the U.S. Pat. No. 4,825,262 discloses a variable wavelength type Fabry-Perot etalon filter that can vary a wavelength by controlling a voltage. Further, the U.S. Pat. No. 5,739,945 discloses a Fabry-Perot etalon filter having a semi conductor/air constitution based on MEMS (Micro Electro-Mechanical System) technology, for increasing a resolution for selecting a wavelength.

Further, Japanese Patent Laid Open Publication (JP-A) H11-142752 discloses an interference filter of a variable transmitted wavelength type. In this variable transmitted wavelength type interference filter, a pair of substrates is disposed in parallel and a multi-layer film is formed on the respective confronting surfaces of the substrates with a certain clearance therebetween, which clearance is variable by an external force.

Figure 11:
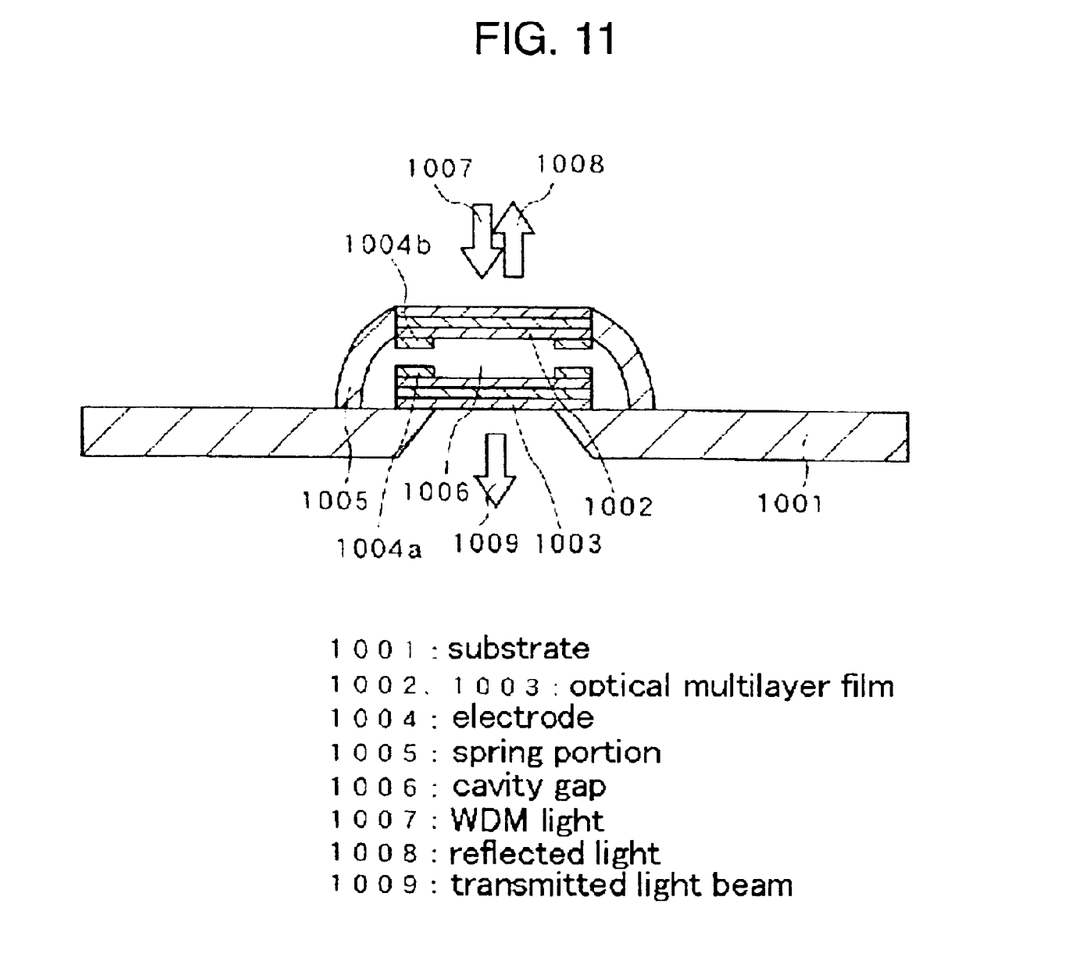
FIG. 11 is a schematic cross-sectional drawing showing a basic constitution of a conventional tunable filter.

FIG. 11 shows a conventional tunable filter similar to the variable wavelength interference filter set forth in the foregoing literature. An optical multilayer film 1003 is formed on a substrate 1001, which is a silicon substrate. The optical multilayer film 1003 is composed of films of a high refractive index and films of a low refractive index, alternately layered. The high index film consists of a $Ta_2O_5$ film while the low index film consists of an $SiO_2$ film, both of which are layered by ion beam deposition. Further an Au film is formed as an electrode 1004a on the optical multilayer film 1003 by sputtering.

In a manufacturing method of such tunable filter, a polyimide film (not shown) is first deposited to form a sacrificial layer, so that a cavity gap 1006 is formed by sacrificial layer etching. An Au film is then formed as an electrode 1004b on the polyimide film by sputtering. Then an $Si_3N_4$ film is formed by sputtering, which serves as a spring portion 1005. Further, another optical multilayer film 1002 is formed in a similar way to the optical multilayer film 1003, i.e. by forming alternate layers of $Ta_2O_5$ films used as high index film and $SiO_2$ films used as low index film utilizing ion beam deposition method. Also, a portion on the substrate 1001 where a transmitted light beam 1009 is to go through is selectively eliminated by silicon crystal anisotropic etching utilizing KOH. And then the sacrificial layer is removed by oxygen plasma ashing, so as to form the cavity gap 1006.

In a tunable filter as constituted above, a clearance between the optical multilayer film 1002 and the optical multilayer film 1003 (cavity gap 1006) can be electrostatically varied by applying a voltage between the electrodes 1004a and 1004b. By controlling the cavity gap 1006 in this way, a wavelength that matches the cavity gap out of the WDM light 1007 can be selectively transmitted, so that a transmitted light beam 1009 is obtained. The remaining portion of the WDM light is reflected and turns into reflected light 1008. Consequently, only light of a desired wavelength passes through the filter, and the wavelength to be transmitted can be varied by controlling the cavity gap 1006.

As a result of performance measurement of a tunable filter of the conventional constitution as above, bandwidth for −1 dB was 0.20 nm, adjacent channel cross talk value was −10.5 dB, tuning range was 1520 to 1630 nm, and insertion loss was 2.1 dB.

SUMMARY OF THE INVENTION

The foregoing conventional tunable filter may be reasonably applicable to a particular condition of use within a certain restriction, however in view of the expected increase of extent of wavelength division multiplication and demand for a more extensive flexibility of wavelength to be used, its performance is not sufficient. Specifically, for example, the adjacent channel cross talk must be smaller in order to increase a number of available wavelengths. Also it is essential to quickly change a wavelength to be added or dropped in the optical add/drop device.

In a conventional system in which a fixed wavelength filter is used, flexibility of wavelength to be used is virtually nonexistent and the filter has to be replaced as a whole in order to change a wavelength to be used, which is a great disadvantage as it requires considerable time and cost.

Also, the tunable filters disclosed in the U.S. Pat. Nos. 4,825,262 and 5,739,945 have a large adjacent channel cross talk value mainly because the Fabry-Perot etalon has only one cavity, therefore it is impossible to increase the number of available wavelengths, which is another serious disadvantage.

The present invention has been achieved in view of the foregoing problems, with an object to provide a tunable filter that can minimize the adjacent channel cross talk despite an increase of a number of available wavelengths and quickly switch a wavelength to be used, and manufacturing method thereof, and also an optical switching device comprising such tunable filter.

A tunable filter according to a first aspect of the present invention comprises a first substrate; a second substrate; a first and a fourth optical multilayer films respectively formed on confronting surfaces of the first substrate and the second substrate; a second optical multilayer film disposed with a clearance from the first optical multilayer film and supported by the first substrate through an elastically deformable spring portion; a third optical multilayer film disposed between the second optical multilayer film and the fourth optical multilayer film with a clearance from both of them and supported by the second substrate through an elastically deformable spring portion; a supporting member for mutually supporting said first substrate and said second in such a manner that a clearance between said first substrate and said second substrate can be changed; and a first, a second, and a third driving devices for respectively changing the clearance between the first and the second optical multilayer films, the clearance between the third and the fourth optical multilayer films and the clearance between the first substrate and the second substrate.

In such tunable filter, the first through the third driving devices may, for example, be electrostatic driving devices comprising a first pair of electrodes respectively provided on confronting surfaces of the first and the second optical multilayer films; a second pair of electrodes respectively provided on confronting surfaces of the third and the fourth optical multilayer films; and a third pair of electrodes respectively provided on the confronting surfaces of the first and the second substrates; for controlling the clearance between the first and the second optical multilayer films, the clearance between the third and the fourth optical multilayer films, and the clearance between the first substrate and the second substrate by changing a voltage to be applied to the respective electrodes.

Also, the first through the third driving devices may be electromagnetic driving devices comprising a first set of a coil film and a magnetic material film respectively provided on the confronting surfaces of the first and the second optical multilayer films; a second set of a coil film and a magnetic material film respectively provided on the confronting surfaces of the third and the fourth optical multilayer films; and a third set of a coil film and a magnetic material film respectively provided on the confronting surfaces of the first and the second substrates; for controlling the clearance between the first and the second optical multilayer films, the clearance between the third and the fourth optical multilayer films, and the clearance between the first substrate and the second substrate by changing a current value to be supplied to the respective coil films.

Also, the first through the third driving devices may be piezoelectric driving devices comprising a first piezoelectric device provided between the confronting surfaces of the first and the second optical multilayer films; a second piezoelectric device provided between the confronting surfaces of the third and the fourth optical multilayer films; and a third piezoelectric device provided between the confronting surfaces of the first and the second substrates; for controlling the clearance between the first and the second optical multilayer films, the clearance between the third and the fourth optical multilayer films, and the clearance between the first substrate and the second substrate by changing a voltage to be applied to the respective piezoelectric devices.

Also, the first through the third driving devices may be a combination of two or three ones selected out of a group including an electrostatic driving device for controlling the clearance between objects to be driven by changing a voltage to be applied between a pair of electrodes, an electromagnetic driving device for controlling the clearance between the objects to be driven by changing a current value to be supplied to a coil film in the sets of the coil film and a magnetic material film, and a piezoelectric driving device for controlling the clearance between the objects to be driven by changing a voltage to be applied to a piezoelectric device provided between the objects to be driven.

A tunable filter according to a second aspect of the invention comprises a first substrate; a second substrate; not less than three optical multilayer films disposed between confronting surfaces of the first substrate and the second substrate; a plurality of supporting members for mutually supporting the respective pairs consisting of adjacent ones among the first substrate, the second substrate, and the optical multilayer films in such a manner that a clearance between the adjacent ones can be controlled; and a plurality of driving devices for controlling a clearance between the adjacent optical multilayer films and a clearance between the first and the second substrates.

A tunable filter according to a third aspect of the invention comprises a substrate; a first optical multilayer film formed on a surface of the substrate; a plurality of second optical multilayer films disposed with a clearance from the first optical multilayer film and between one and another and respectively supported by the substrate through an elastically deformable spring portion; and a plurality of driving devices for controlling the clearance between adjacent ones among the first optical multilayer film and the second optical multilayer films.

In these tunable filters, the driving devices may, for example, be a one selected out of a group including an electrostatic driving device for controlling the clearance between objects to be driven by changing a voltage to be applied between a pair of electrodes, an electromagnetic driving device for controlling the clearance between the objects to be driven by changing a current value to be supplied to a coil film in the sets of the coil film and a magnetic material film, and a piezoelectric driving device for controlling the clearance between the objects to be driven by changing a voltage to be applied to a piezoelectric device provided between the objects to be driven.

Also, the driving devices may be a combination of two or three ones selected out of a group including an electrostatic driving device for controlling the clearance between objects to be driven by changing a voltage to be applied between a pair of electrodes, an electromagnetic driving device for controlling the clearance between the objects to be driven by changing a current value to be supplied to a coil film in the sets of the coil film and a magnetic material film, and a piezoelectric driving device for controlling the clearance between the objects to be driven by changing a voltage to be applied to a piezoelectric device provided between the objects to be driven.

Method of manufacturing a tunable filter according to a fourth aspect of the invention comprises the steps of forming a first optical multilayer film on a first substrate; forming a first sacrificial layer on the first optical multilayer film; forming a second optical multilayer film on the first sacrificial layer; forming a first spring portion that connects the second optical multilayer film and the first substrate; removing the first sacrificial layer by etching thus to form a gap between the first and the second optical multilayer films; forming a fourth optical multilayer film on a second substrate; forming a second sacrificial layer on the fourth optical multilayer film; forming a third optical multilayer film on the second sacrificial layer; forming a second spring portion that connects the third optical multilayer film and the second substrate; removing the second sacrificial layer by etching thus to form a gap between the third and the fourth optical multilayer films; and combining the first substrate and the second substrate with a clearance between the second optical multilayer film and the third optical multilayer film; and providing a first driving device between the first and the second optical multilayer films; providing a second driving device between the third and the fourth optical multilayer films; and providing a third driving device between the first and the second substrates.

Method of manufacturing a tunable filter according to a fifth aspect of the invention comprises the steps of forming a first optical multilayer film on a substrate; forming a plurality of layered composites including sacrificial layers and second optical multilayer films on the first optical multilayer film and a plurality of spring portions respectively connecting each of the second optical multilayer films with the substrate; removing the sacrificial layers by etching thus to form a gap between adjacent ones among the first and the second optical multilayer films; and providing a driving device between the adjacent ones among the first and the second optical multilayer films respectively.

Further, an optical switching device according to a sixth aspect of the invention comprises the foregoing tunable filters.

The tunable filter according to the invention is a tunable filter having a Fabri-Perot etalon structure, comprising not less than two cavity gaps. And as driving method for controlling or changing the clearance of the cavity gap, for example electrostatic drive, electromagnetic drive or piezoelectric drive, or a combination of two or three out of the electrostatic drive, electromagnetic drive and piezoelectric drive is adopted.

Also, in manufacturing method of the tunable filter having a Fabry-Perot etalon structure, the cavity gaps are formed by removing the sacrificial layers by etching.

Further, these tunable filters can be used in an optical switching device of an optical cross-connect device or an optical add/drop device, etc.

The objects are achieved by combinations described in the independent claims. The dependent claims define further advantageous and exemplary combinations of the present invention.

This summary of the invention does not necessarily describe all necessary features so that the invention may also be a sub-combination of these described features.

DETAILED DESCRIPTION OF THE INVENTION

The invention will now be described based on the preferred embodiments. This does not intend to limit the scope of the present invention, but exemplify the invention.

Now, tunable filters according to the embodiments of the present invention shall be specifically described hereunder, referring to the accompanying drawings.

[First Embodiment]

Figure 1:
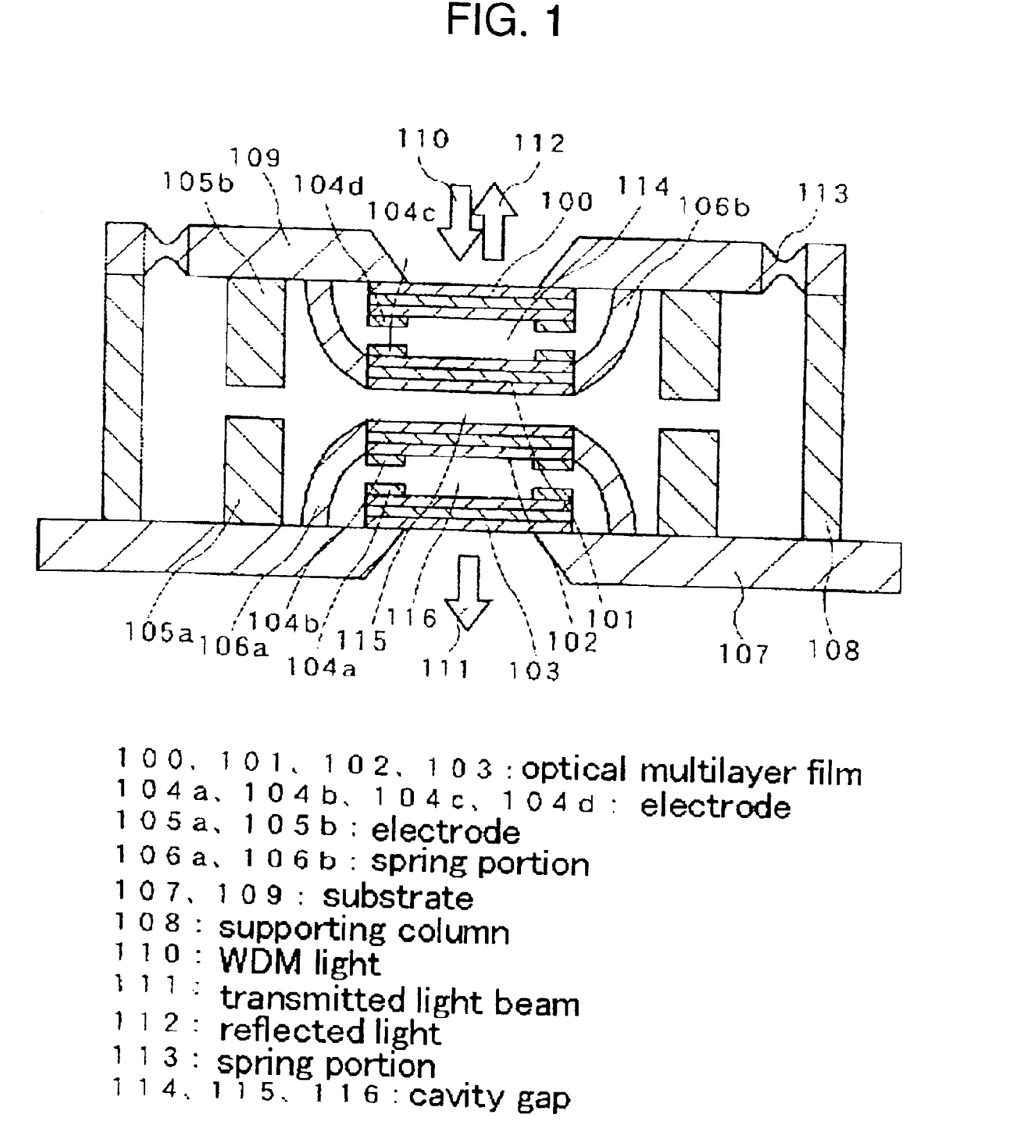
FIG. 1 is a schematic cross-sectional drawing showing a basic constitution of a tunable filter according to the first embodiment of the present invention.

FIG. 1 is a schematic cross-sectional drawing showing a basic constitution of a tunable filter according to the first embodiment of the invention. In this embodiment, electrostatic drive is adopted for controlling cavity gaps. Manufacturing method of the tunable filter shall be described first, and then the constitution of the tunable filter shall be described. An optical multilayer film 103 is coated on a substrate 107 constituted of a silicon substrate. The optical multilayer film 103 comprises high index films and low index films alternately layered. As the high index film, for example a $Ta_2O_5$ film is used, while an $SiO_2$ film is used as the low index film, and these are layered by ion beam deposition for example in 17 layers in total, each having a film thickness of ¼ optical wavelength. Then an Au film is formed in a pattern on the optical multilayer film 103 by sputtering, which is to serve as an electrode 104a.

And then a polyimide film (not shown) is deposited as a sacrificial layer, to later form a cavity gap 116 by sacrificial layer etching. Further on this polyimide film, an Au film is formed in a pattern by sputtering, to form an electrode 104b. Then an $Si_3N_4$ film is coated by sputtering to form a spring portion 106a. Furthermore, similarly to the optical multilayer film 103, for example high index films made of $Ta_2O_5$ and low index films made of $SiO_2$ are layered by ion beam deposition in 35 layers in total, each having a film thickness of ¼ optical wavelength, thus to form another optical multilayer film 102.

Also, an electrode 105a is formed on the substrate 107 by sputter-coating an Au film. Supporting columns 108 are then formed by anodic bonding of glass. And then a portion on the substrate 107 where a transmitted light beam 111 is to go through is selectively eliminated by silicon crystal anisotropic etching utilizing KOH. And the sacrificial layer (polyimide film) is removed by oxygen plasma ashing, so as to form the cavity gap 116.

Now, another silicon substrate is provided as a substrate 109, and a spring portion 113 is formed at a border portion of the substrate 109 by applying wet etching to a part of the border portion thereof utilizing KOH. An optical multilayer film 100 is then coated on the substrate 109. In the optical multilayer film 100 a $Ta_2O_5$ film is used as high index films and an $SiO_2$ film is used as low index films, and these are layered by ion beam deposition in 17 layers in total, each having a film thickness of ¼ optical wavelength. Then an Au film is coated on the optical multilayer film 100 by sputtering, thus to form an electrode 104d.

And a polyimide film (not shown) is deposited as a sacrificial layer, to later form a cavity gap 114 by etching on the sacrificial layer. Further, on this polyimide film an Au film is coated by sputtering, to form an electrode 104c. Then an $Si_3N_4$ film is coated by sputtering to form a spring portion 106b. Furthermore, similarly to the optical multilayer film 100, $Ta_2O_5$ films used as high index films and $SiO_2$ films used as low index films are layered by ion beam deposition in 35 layers in total, each having a film thickness of ¼ optical wavelength, thus to form another optical multilayer film 101.

Also, an electrode 105b is formed on the substrate 109 by sputter-coating an Au film. And the sacrificial layer (polyimide film) is removed by oxygen plasma ashing, so as to form the cavity gap 114. Then the substrate 109 is combined with the supporting columns 108 by anodic bonding, in such a manner that the optical multilayer film 101 and the optical multilayer film 102 confront each other. As a result, a cavity gap 115 is formed between the optical multilayer film 101 and the optical multilayer film 102.

In addition, it is a matter of course that in the foregoing embodiment the number of layers of the respective optical multilayer films and the materials of the films are merely an example and not limited to those described.

Now, operation of the tunable filter according to this embodiment shall be described. The cavity gap 116 can be controlled by changing a voltage applied between the electrode 104a and the electrode 104b; the cavity gap 114 can be controlled by changing a voltage applied between the electrode 104c and the electrode 104d; and the cavity gap 115 can be controlled by changing a voltage applied between the electrode 105a and the electrode 105b. As a result of controlling the respective cavity gaps 114, 115, and 116 in this way, only those wavelengths that match the cavity gaps out of WDM light 110 can be selectively transmitted, so that a transmitted light beam 111 is obtained. The remaining portion of the WDM light is reflected, to turn into reflected light 112. Since there are three cavity gaps 114, 115 and 116 according to this embodiment, selectivity of wavelength to be transmitted is remarkably expanded, and flexibility in use of wavelengths is also increased.

Figure 2:
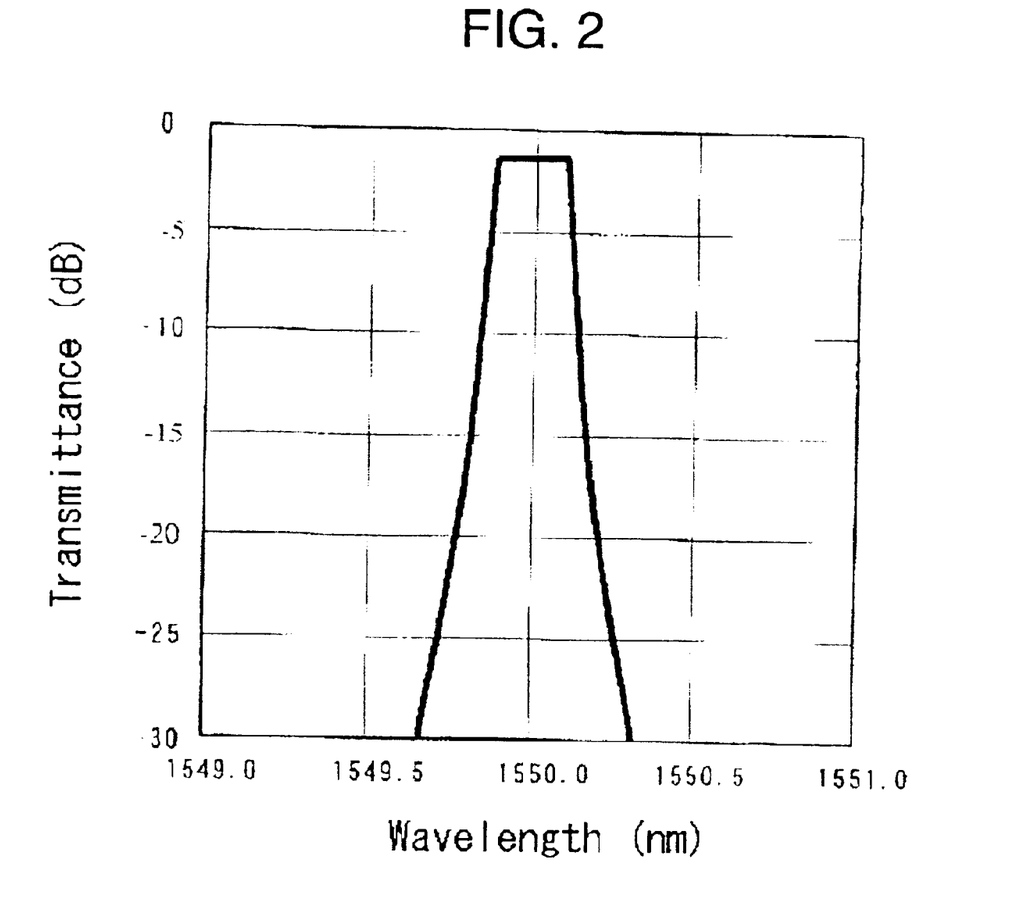
FIG. 2 is a line graph showing tuning waveform characteristics of the tunable filter according to the first embodiment.

Now, with an object to assure a performance level of the tunable filter according to the invention, measurement result of wavelength dependence of selected light with respective cavity gaps 114, 115, and 116 adjusted at 1550 nm shall be described. FIG. 2 shows a wavelength dependence of selected light, wherein the abscissa axis represents wavelength and the ordinate axis represents transmittance. The measurement result is based on the type of materials and number of layers of the optical multilayer films described in this embodiment. Bandwidth corresponding to −1 dB is 0.22 nm, which satisfies the bandwidth requirement of greater than 0.2 nm according to WDM specification for 100 GHz (with channel spacing of 0.8 nm). Also, a desirable adjacent channel cross talk value is not greater than −25 dB in general in WDM at 100 GHz, while FIG. 2 shows −29.1 dB, which is also well above the norm. Also, tuning range was 1520 nm to 1630 nm; insertion loss was 1.5 dB; and tuning speed was 5 msec.

[Second Embodiment]

Figure 3:
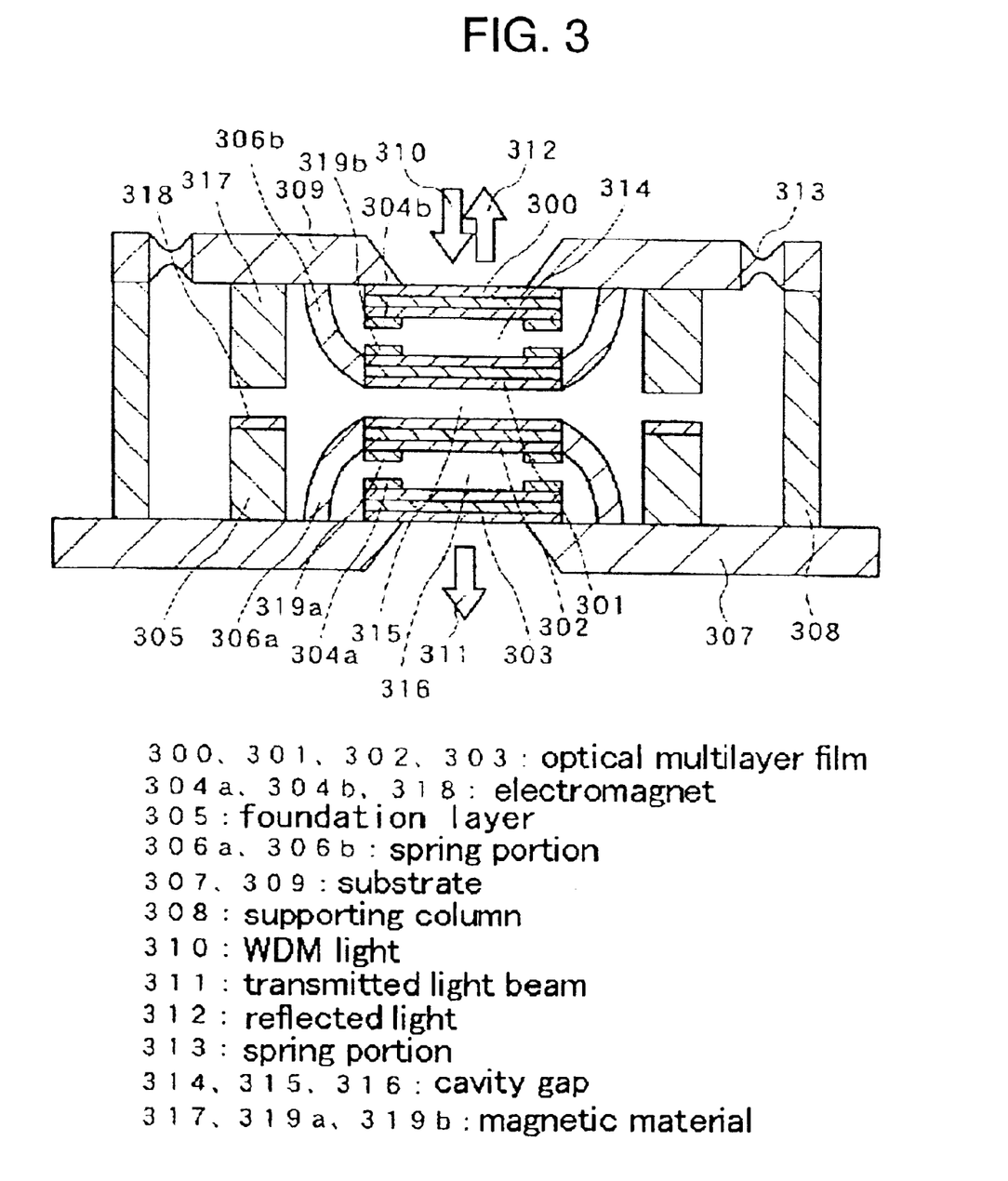
FIG. 3 is a schematic cross-sectional drawing showing a basic constitution of a tunable filter according to the second embodiment of the invention.
Figure 4:
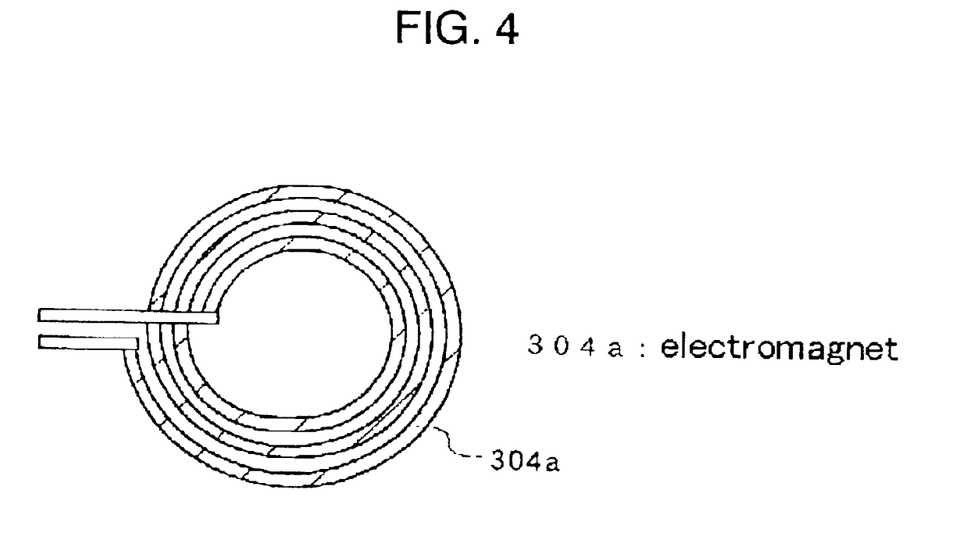
FIG. 4 is a schematic drawing showing an electromagnetic coil for electromagnetic drive used in the tunable filter according to the second embodiment.

FIG. 3 is a schematic cross-sectional drawing showing a basic constitution of a tunable filter according to the second embodiment of the invention. In this embodiment, the cavity gaps are controlled by electromagnetic drive. An optical multilayer film 303 is coated on a silicon substrate, which is to serve as substrate 307. The optical multilayer film 303 is formed of high index films and low index films alternately layered. A $Ta_2O_5$ film is used as the high index film, and an $SiO_2$ film is used as the low index film, and these are layered by ion beam deposition in 17 layers in total, each having a film thickness of ¼ optical wavelength. Then an Au film is formed in a coil shape, which is to serve as an electromagnet 304a. FIG. 4 shows a coil shape of the electromagnet 304a.

Then a polyimide film is deposited as a sacrificial layer, to later form a cavity gap 316 by etching on the sacrificial layer. Further on this polyimide film, a Co, Ni or Fe family material is coated by sputtering, to form a magnetic material 319a. Then an $Si_3N_4$ film is coated by sputtering to form a spring portion 306a. Furthermore, similarly to the optical multilayer film 303, $Ta_2O_5$ used as high index films and $SiO_2$ used as low index films are layered by ion beam deposition in 35 layers in total, each having a film thickness of ¼ optical wavelength, thus to form another optical multilayer film 302. Also an $SiO_2$ film is formed as foundation layer 305 by sputtering on the substrate 307. On the foundation layer 305, an electromagnet 318 is formed in a similar way to the electromagnet 304. Then supporting columns 308 are formed on the substrate 307 by glass anodic bonding. And then a portion on the substrate 307 where a transmitted light beam 311 is to go through is selectively eliminated by silicon crystal anisotropic etching utilizing KOH. And the sacrificial layer is removed by oxygen plasma ashing, so as to form the cavity gap 316.

Now, another silicon substrate is provided as a substrate 309, and a spring portion 313 is formed at a border portion of the substrate 309 by applying wet etching to a part of the border portion thereof utilizing KOH. An optical multilayer film 300 is then coated on the substrate 309. The optical multilayer film 300 comprises $Ta_2O_5$ used as high index films and $SiO_2$ used as low index films, layered by ion beam deposition in 17 layers in total, each having a film thickness of ¼ optical wavelength. Then an Au film is coated in a coil shape on the optical multilayer film 300 by sputtering, thus to form an electrode 304b. After that, a polyimide film (not shown) is deposited as a sacrificial layer, to later form a cavity gap 314 by etching on the sacrificial layer. Further on this polyimide film, a Co, Ni or Fe family material is coated by sputtering, to form a magnetic material 319b. Then an $Si_3N_4$ film is coated by sputtering to form a spring portion 306b. Furthermore, similarly to the optical multilayer film 300, another optical multilayer film 301 is coated. The optical multilayer film 301 comprises $Ta_2O_5$ used as high index films and $SiO_2$ used as low index films, layered by ion beam deposition in 35 layers in total, each having a film thickness of ¼ optical wavelength. Also, a Co, Ni or Fe family material is coated by sputtering on the substrate 309, to form a magnetic material 317. And the sacrificial layer is removed by oxygen plasma ashing, so as to form the cavity gap 314. Then the substrate 309 is combined with the supporting columns 308 by anodic bonding, in such a manner that the optical multilayer film 301 and the optical multilayer film 302 confront each other. As a result, a cavity gap 315 is formed between the optical multilayer film 301 and the optical multilayer film 302.

In the tunable filter constituted as above according to this embodiment, the cavity gaps 314, 315 and 316 can be changed by changing a current value supplied to the electromagnets 304a, 304b and 318. As a result of controlling the respective cavity gaps, only those wavelengths that match the cavity gaps out of WDM light 310 an be selectively transmitted, so that a transmitted light beam 311 is obtained. The remaining portion of the WDM light is reflected, to turn into reflected light 312. In addition, it is a matter of course that also in this embodiment the materials and number of layers of the respective optical multilayer films are not limited to those described.

Performance of the tunable filter according to this embodiment, with the respective layers constituted as above, has proved to be as follows: Bandwidth corresponding to −1 dB is 0.23 nm; adjacent channel cross talk value is −28.4 dB; tuning range was 1520 nm to 1630 nm; insertion loss was 1.7 dB; and tuning speed was 5 msec.

[Third Embodiment]

Figure 5:
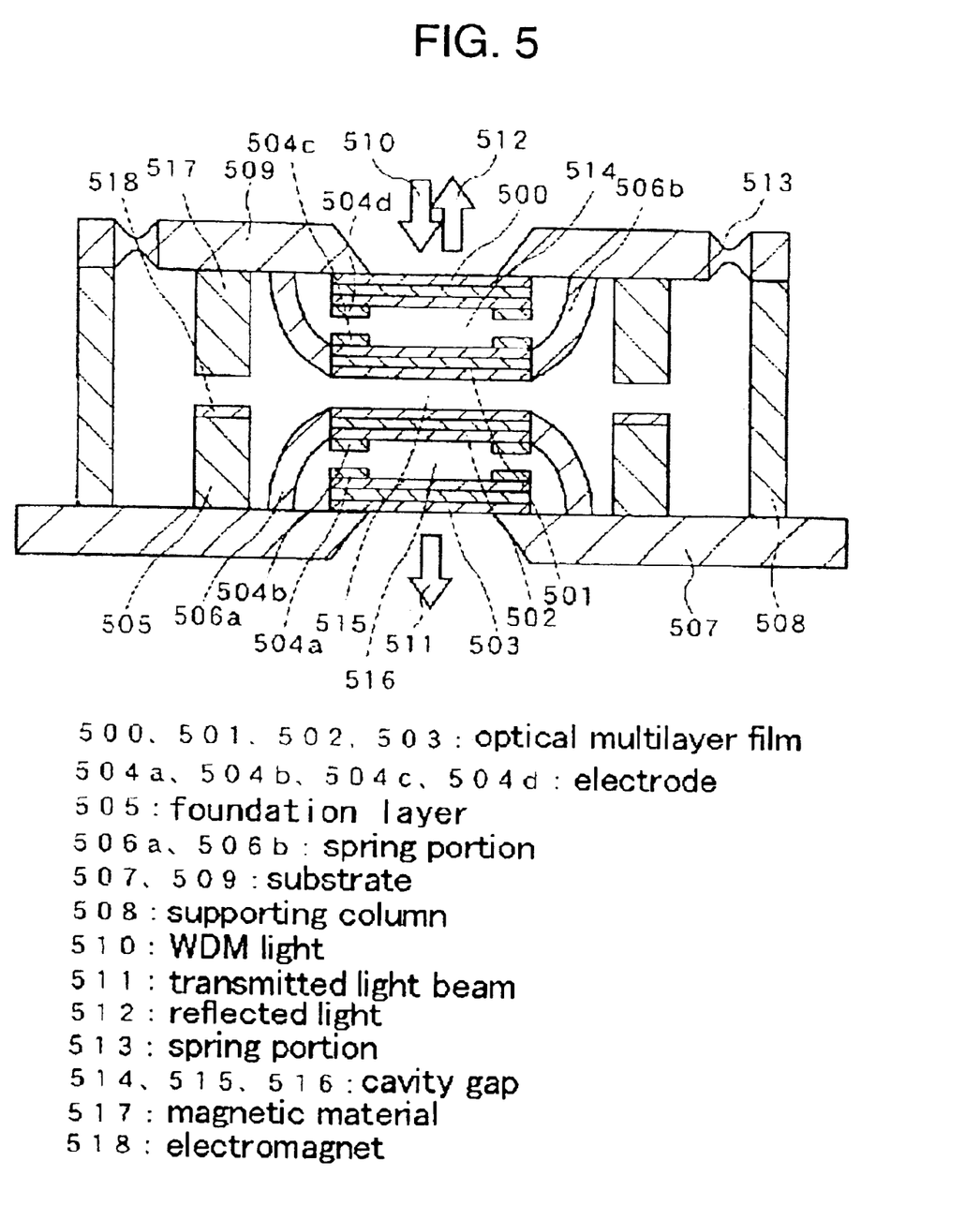
FIG. 5 is a schematic cross-sectional drawing showing a basic constitution of a tunable filter according to the third embodiment of the invention.

FIG. 5 is a schematic cross-sectional drawing showing a basic constitution of a tunable filter according to the third embodiment of the invention. In this embodiment, the electrostatic drive and the electromagnetic drive are employed in combination to control the cavity gaps. An optical multilayer film 503 is coated on a silicon substrate 507. The optical multilayer film 503 comprises high index films and low index films alternately layered. A $Ta_2O_5$ film is used as the high index film, and an $SiO_2$ film is used as the low index film, and these are layered by ion beam deposition in 17 layers in total, each having a film thickness of ¼ optical wavelength. Then an Au film is coated by sputtering, to form an electrode 504a. After that, a polyimide film (not shown) is deposited as a sacrificial layer, to later form a cavity gap 516 by etching on the sacrificial layer. Further on this polyimide film, an Au film is coated by sputtering to form an electrode 504b. Then an $Si_3N_4$ film is coated by sputtering to form a spring portion 506a. Furthermore, another optical multilayer film 502 is formed in a similar way to the optical multilayer film 503. Specifically, high index films made of $Ta_2O_5$ and low index films made of $SiO_2$ are layered by ion beam deposition in 35 layers in total, each having a film thickness of ¼ optical wavelength, thus to form the multi-layer film 502. Also, a foundation layer 505 is formed by sputtering an $SiO_2$ film. On the foundation layer 505, an Au film is coated by sputtering in a coil shape to form an electromagnet 518. Then supporting columns 508 are formed by glass anodic bonding. And then a portion on the substrate 507 where a transmitted light beam 511 is to go through is eliminated by silicon crystal anisotropic etching utilizing KOH. And the sacrificial layer is removed by oxygen plasma ashing, so as to form the cavity gap 516.

Now, another silicon substrate is provided as a substrate 509, and a spring portions 513 is formed by wet etching utilizing KOH. An optical multilayer film 500 is then coated on the substrate 509. The optical multilayer film 500 comprises $Ta_2O_5$ used as high index films and $SiO_2$ used as low index films, layered by ion beam deposition in 17 layers in total, each having a film thickness of ¼ optical wavelength. After that, an Au film is coated by sputtering to form an electrode 504d. And a polyimide film is deposited as a sacrificial layer, to later form a cavity gap 514 by sacrificial layer etching. Further on the polyimide film an Au film is coated by sputtering to form an electrode 504c. Then an $Si_3N_4$ film is coated by sputtering to form a spring portion 506b. Furthermore, another optical multilayer film 501 is formed in a similar way to the optical multilayer film 502. The optical multilayer film 502 comprises high index films made of $Ta_2O_5$ and low index films made of $SiO_2$, layered by ion beam deposition in 35 layers in total, each having a film thickness of ¼ optical wavelength. Also, a magnetic material 517 is formed by sputtering a Co, Ni or Fe family material on the substrate 509. And the sacrificial layer is removed by oxygen plasma ashing, so as to form the cavity gap 514. Then the substrate 509 is combined with the supporting columns 508 by anodic bonding, in such a manner that the optical multilayer film 501 and the optical multilayer film 502 confront each other. As a result, a cavity gap 515 is formed between the optical multilayer film 501 and the optical multilayer film 502.

In the tunable filter constituted as above according to this embodiment, the cavity gaps 516 and 514 can be changed by changing a voltage applied between the electrodes 504a and 504b and between the electrodes 504c and 504d respectively. Also, the cavity gap 515 can be changed by supplying a current to the electromagnet 518. As a result of controlling the respective cavity gaps, only those wavelengths that match the cavity gaps out of WDM light 510 can be selectively transmitted, so that a transmitted light beam 511 is obtained. The remaining portion of the WDM light is reflected, to turn into reflected light 312.

Performance of the tunable filter according to this embodiment, with the respective layers constituted as above, has proved to be as follows: Bandwidth corresponding to −1 dB is 0.23 nm; adjacent channel cross talk value is −28.3 dB; tuning range was 1520 nm to 1630 nm; insertion loss was 1.9 dB; and tuning speed was 5 msec. In addition, the application of the electrostatic drive and the electromagnetic drive according to this embodiment may be reversed.

[Fourth Embodiment]

Figure 6:
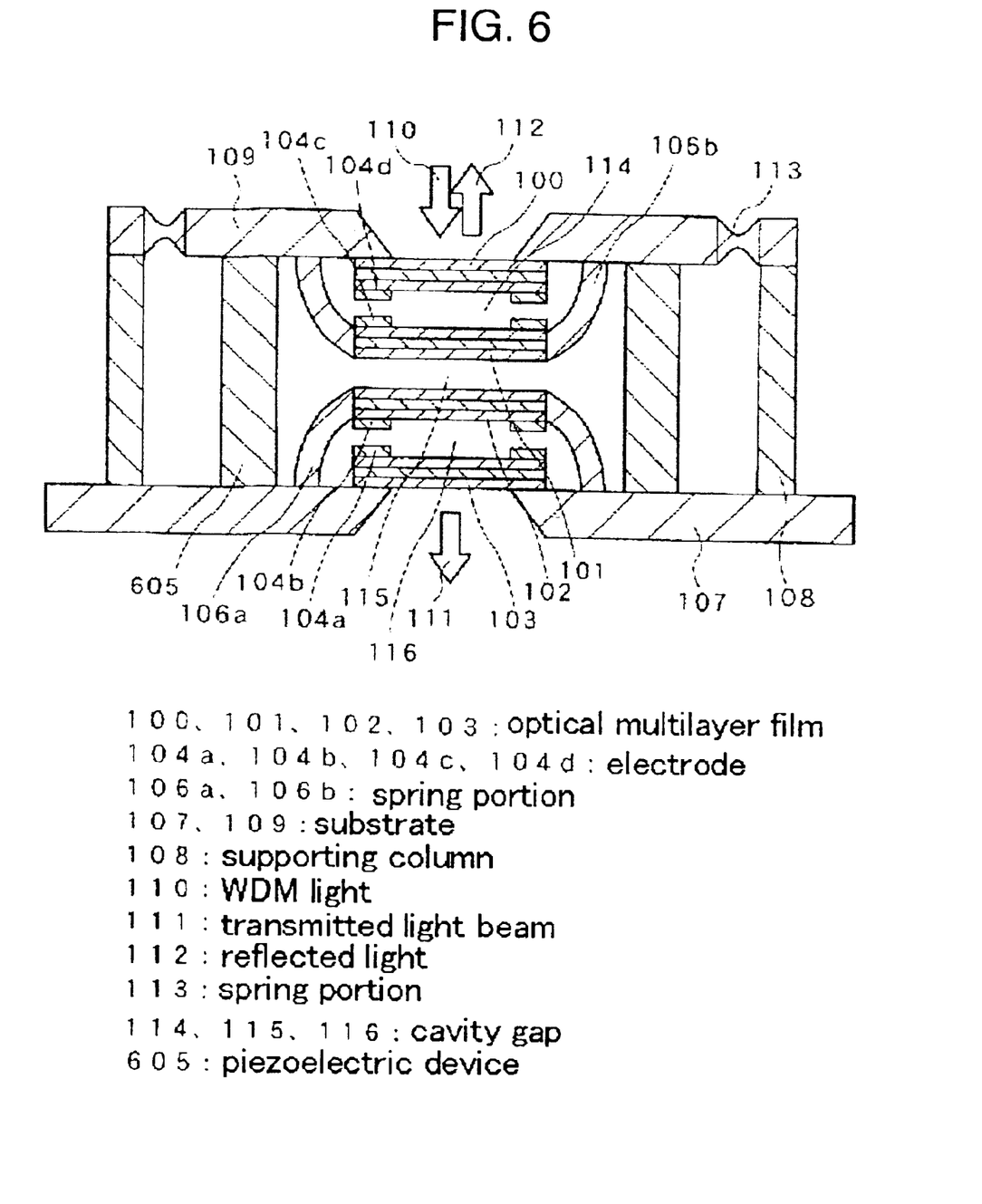
FIG. 6 is a schematic cross-sectional drawing showing a basic constitution of a tunable filter according to the fourth embodiment of the invention.

FIG. 6 is a schematic cross-sectional drawing showing a tunable filter according to the fourth embodiment of the invention. The tunable filter according to the fourth embodiment is constituted so as to control the cavity gaps by piezoelectric drive, wherein the only difference from the first embodiment shown in FIG. 1 is that piezoelectric devices 605 are used instead of the electrodes 105a and 105b. Therefore, in FIG. 6 components that are identical to those in FIG. 1 are given the identical numerals, and detailed description thereof shall be omitted. Lead zirconate titanate is used as the piezoelectric devices 605, which are bonded by soldering on the substrate 607 and the substrate 609.

In the tunable filter according to this embodiment, the cavity gaps 114 and 116 can be adjusted through the electrostatic drive by controlling a voltage applied to the electrodes 104a to 104d, while the cavity gap 115 can be adjusted by controlling a voltage applied to the piezoelectric devices 605.

Performance of the tunable filter according to this embodiment, with the respective layers constituted as above, has proved to be as follows: Bandwidth corresponding to −1 dB is 0.21 nm; adjacent channel cross talk value is −26.2 dB; tuning range was 1520 nm to 1630 nm; insertion loss was 2.3 dB; and tuning speed was 5 msec. In addition, the piezoelectric drive may be employed in all the driving devices. Specifically, piezoelectric devices similar to the piezoelectric devices 605 may be provided instead of the electrodes 104a through 104d, between the optical multilayer film 103 and the optical multilayer film 102 as well as between the optical multilayer film 100 and the optical multilayer film 101. Otherwise, any of the electrostatic drive, electromagnetic drive or piezoelectric drive may be arbitrarily selected for controlling the respective cavity gaps 114, 115 and 116, when constituting the tunable filter.

[Fifth Embodiment]

Figure 7:
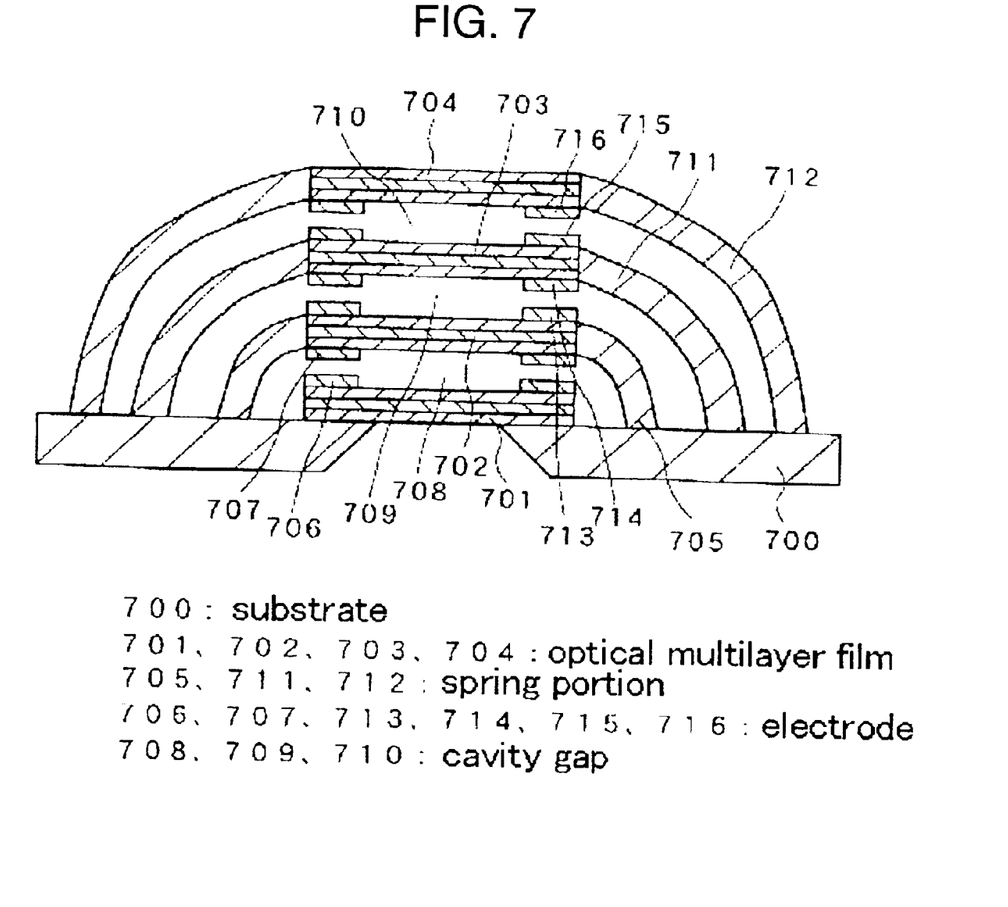
FIG. 7 is a schematic cross-sectional drawing showing a basic constitution of a tunable filter according to the fifth embodiment of the invention.

FIG. 7 is a schematic cross-sectional drawing showing a basic constitution of a tunable filter according to the fifth embodiment of the invention. A silicon substrate is used as substrate 700, on which an optical multilayer film 701 is coated. The optical multilayer film 701 comprises high index films and low index films alternately layered. $Ta_2O_5$ is used as the high index films and $SiO_2$ is used as the low index films, which are layered by ion beam deposition in 17 layers in total, each having a film thickness of ¼ optical wavelength. Then an Au film is coated by sputtering, to form an electrode 706. After that, a polyimide film (not shown) is deposited as a sacrificial layer, to later form a cavity gap 708 by etching on the sacrificial layer, and further on this polyimide film an Au film is coated by sputtering to form an electrode 707. Then an $Si_3N_4$ film is coated by sputtering to form a spring portion 705. Furthermore, another optical multilayer film 702 is formed in a similar way to the optical multilayer film 701. The optical multilayer film 702 comprises $Ta_2O_5$ as high index films and $SiO_2$ as low index films, layered by ion beam deposition in 35 layers in total, each having a film thickness of ¼ optical wavelength.

Then an electrode 713 is formed by sputtering Au. After that, polyimide is deposited as a sacrificial layer, and further on this polyimide film, an Au film is coated by sputtering to form an electrode 714. Then an $Si_3N_4$ film is coated by sputtering to form a spring portion 711. Furthermore, another optical multilayer film 703 is formed in a similar way to the optical multilayer film 702. The optical multilayer film 703 comprises high index films made of $Ta_2O_5$ and low index films made of $SiO_2$, layered by ion beam deposition in 35 layers in total, each having a film thickness of ¼ optical wavelength. Then an electrode 715 is formed by sputtering Au. After that, polyimide is deposited as a sacrificial layer. Further on this polyimide film, an Au film is coated by sputtering to form an electrode 716. Then an $Si_3N_4$ film is coated by sputtering to form a spring portion 712. Furthermore, another optical multilayer film 704 is formed in a similar way to the optical multilayer film 701. The optical multilayer film 704 comprises high index films made of $Ta_2O_5$ and low index films made of $SiO_2$, layered by ion beam deposition in 17 layers in total, each having a film thickness of ¼ optical wavelength. And then a portion on the substrate 700 where a transmitted light beam is to go through is eliminated by silicon crystal anisotropic etching utilizing KOH. Finally the sacrificial layers are removed by oxygen plasma ashing, so as to form the cavity gaps 708, 709, and 710.

The cavity gaps 708, 709 and 710 can be changed by applying a voltage to the electrodes 706 and 707 and the electrodes 713 through 716. As a result of controlling the respective cavity gaps in this way, only those wavelengths that match the cavity gaps out of WDM light can be selectively transmitted, so that a transmitted light beam is obtained. The remaining portion of the WDM light is reflected, to turn into reflected light.

Performance of the tunable filter according to this embodiment has proved to be, for example, as follows: Bandwidth corresponding to −1 dB is 0.21 nm; adjacent channel cross talk value is −25.2 dB; tuning range was 1520 nm to 1630 nm; insertion loss was 2.8 dB; and tuning speed was 5 msec. In addition, any of the electrostatic drive, electromagnetic drive or piezoelectric drive may be arbitrarily selected for controlling the respective cavity gaps 708, 709 and 710, when constituting the tunable filter.

[Sixth Embodiment]

Figure 8:
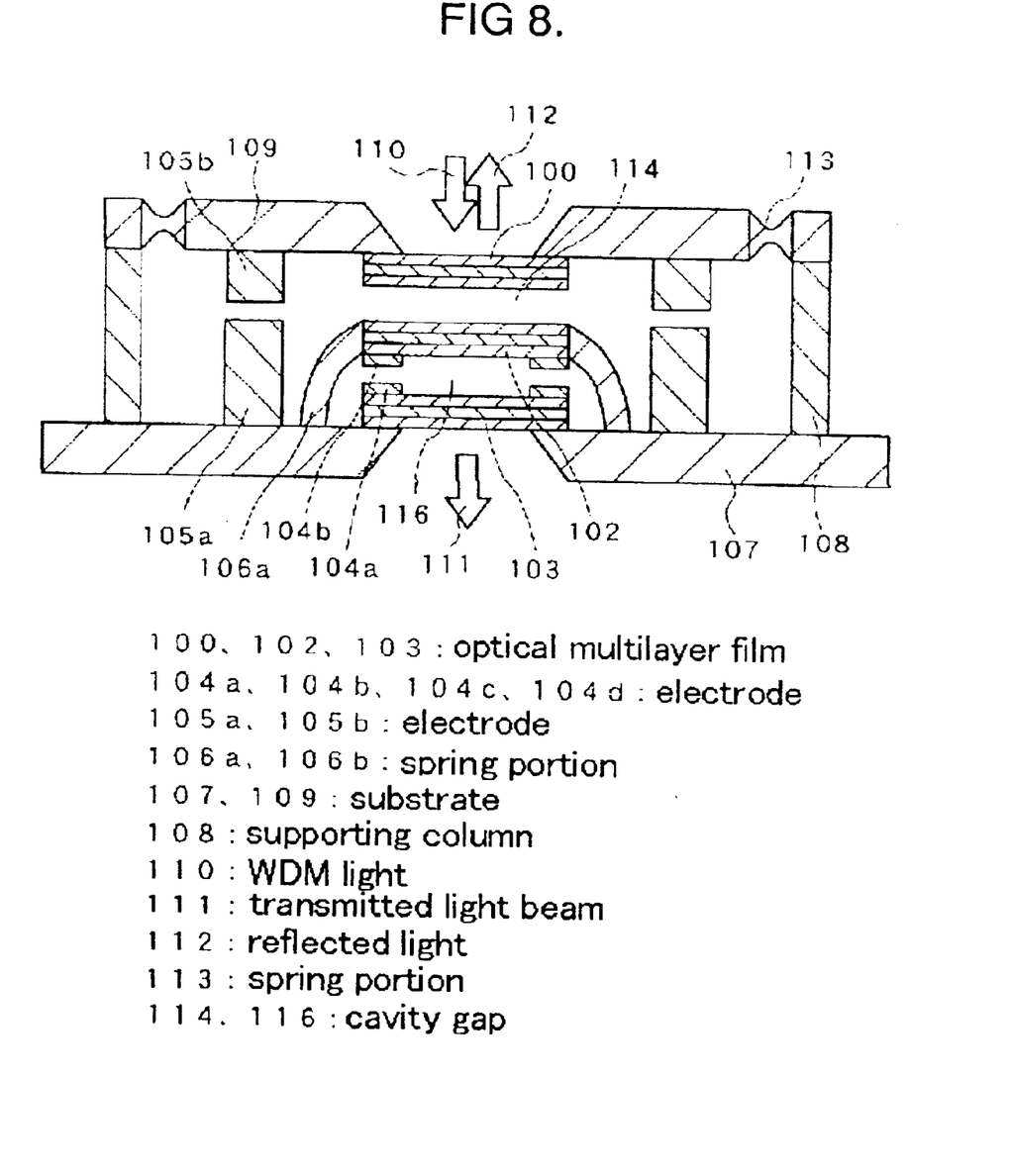
FIG. 8 is a schematic cross-sectional drawing showing a basic constitution of a tunable filter according to the sixth embodiment of the invention.

FIG. 8 is a schematic cross-sectional drawing showing a basic constitution of a tunable filter according to the sixth embodiment of the invention. The only difference of the tunable filter of this embodiment from that of the first embodiment shown in FIG. 1 is that the former has only two cavity gaps while the latter has three. Constitution of each layer is similar to that described in the first embodiment. Accordingly, in this embodiment, components that are identical to those in FIG. 1 are given the identical numerals, and detailed description thereof shall be omitted.

Performance of the tunable filter according to this embodiment has proved to be as follows: Bandwidth corresponding to −1 dB is 0.20 nm; adjacent channel cross talk value is −21.3 dB; tuning range was 1520 nm to 1630 nm; insertion loss was 1.8 dB; and tuning speed was 5 msec.

[Seventh Embodiment]

Figure 9:
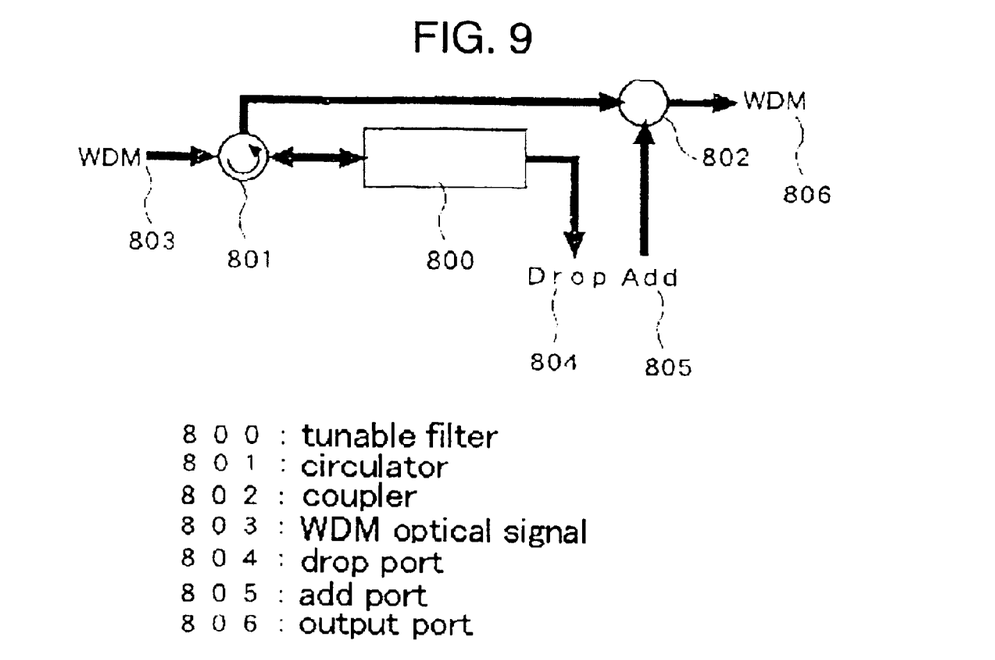
FIG. 9 is a block diagram of an optical add/drop device in which the tunable filter of the invention is incorporated.

FIG. 9 is a block diagram of an optical add/drop device in which the tunable filter of the invention is incorporated as an optical switching device. WDM optical signal 803 is provided to a circulator 801 and transmitted to a tunable filter 800 serving as an optical switching device. A predetermined particular wavelength out of the WDM optical signal that has entered into the tunable filter 800 is emitted through a drop port 804, while the optical signal of the remaining wavelengths returns to the circulator 801, to be transmitted to a coupler 802. Also, a desired optical signal to be added to the WDM optical signal is provided through an add port 805, to be coupled in the coupler 802 and emitted through an output port 806.

According to this embodiment, since the tunable filter of the invention is incorporated as an optical switching device, adjacent channel cross talk of the light to be dropped or added can be minimized and an S/N ratio of the optical signal can be increased. Also, a tuning speed as high as 9 msec, for example, can be achieved.

[Eighth Embodiment]

Figure 10:
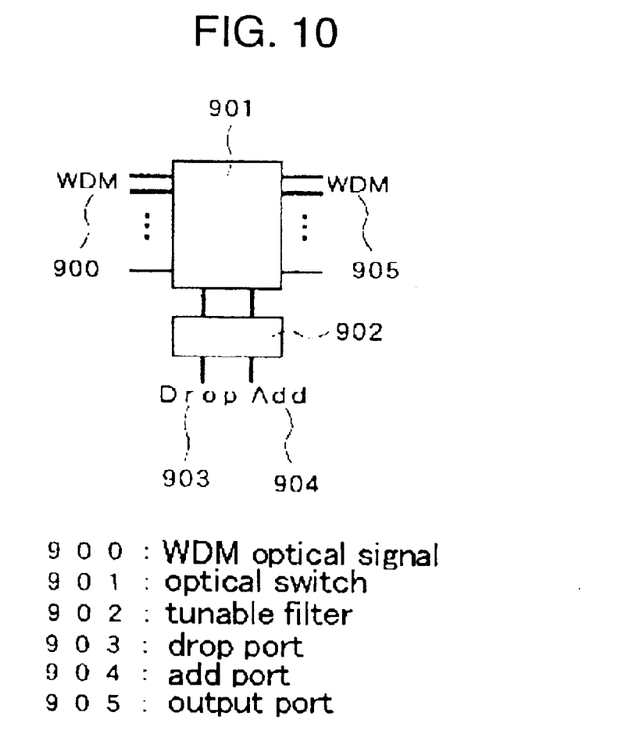
FIG. 10 is a block diagram of an optical cross-connect device in which the tunable filter of the invention is incorporated.

FIG. 10 is a block diagram of an optical cross-connect device in which the tunable filter of the invention is incorporated as an optical switching device. A plurality of WDM optical signals 900 is provided to an optical switch 901 comprising the tunable filter of the invention. In this case, a number of available wavelengths of the WDM optical signal may be 1. Type of the optical switch 901 may be any of currently available ones including a type utilizing a micro mirror or a type that performs electric switching after photoelectric conversion. A part of the WDM optical signal 900 that is incident to the optical switch 901 is provided to the tunable filter 902, in which only an arbitrary optical signal is tuned and dropped through a drop port 903, and then another arbitrary optical signal is provided through an add port 904 and coupled, after which the optical signal is returned to the optical switch 901, to be switched again and output through an output port 905.

In this case also, since the tunable filter of the invention is incorporated as an optical switching device, adjacent channel cross talk of the light to be dropped or added can be minimized and an S/N ratio of the optical signal can be increased. Also, a tuning speed as high as 9 msec can be achieved.

With reference to the foregoing embodiments, the optical multilayer film may be constituted in any way as long as it has the function of a semi-permeable mirror, and constituting method thereof is not limited to those described in the respective embodiments. For example, the optical multilayer film may be made of a semi-conductor such as silicon, or a metal such as gold. Regarding the substrate, without limitation to the silicon substrate, a ceramic material including glass or a semi-conductor material including GaAs, etc. Also with regard to forming method of the cavity gap by sacrificial layer etching, a material of the sacrificial layer is not limited to polyimide but other materials including a metal such as Al or organic materials can be employed, and method of removing the sacrificial layer may be for example a wet method. Further, a number of the cavity gaps is not limited, as long as it is not less than two.

Comparison of the results of the characteristics test of the first through eighth embodiments with characteristics test results of a conventional tunable filter proves the following. While adjacent channel cross talk is extremely high in a conventional tunable filter, a minimal adjacent channel cross talk can be achieved by the tunable filter of the invention.

Also, it takes minutes to even hours for switching a wavelength by a switching system in which a conventional fixed wavelength filter is used, while a wavelength can be switched in several microseconds by the switching system according to the invention.

As described above, according to the invention a tunable filter that can minimize the adjacent channel cross talk despite an increase of a number of available wavelengths and quickly switch a wavelength to be used, and an optical switching device comprising such tunable filter can be accomplished.

Although the present invention has been described by way of exemplary embodiments, it should be understood that many changes and substitutions may be made by those skilled in the art without departing from the spirit and the scope of the present invention which is defined only by the appended claims.

What is claimed is:

1. Method of manufacturing a tunable filter comprising:
the steps of forming a first optical multilayer film on a first substrate;
forming a first sacrificial layer on said first optical multilayer film;
forming a second optical multilayer film on said first sacrificial layer;
forming a first spring portion that connects said second optical multilayer film and said first substrate;
removing said first sacrificial layer by etching thus to form a gap between said first and said second optical multilayer films;
forming a fourth optical multilayer film on a second substrate;
forming a second sacrificial layer on said fourth optical multilayer film;
forming a third optical multilayer film on said second sacrificial layer;
forming a second spring portion that connects said third optical multilayer film and said second substrate;
removing said second sacrificial layer by etching thus to form a gap between said third and said fourth optical multilayer films; and
combining said first substrate and said second substrate with a clearance between said second optical multilayer film and said third optical multilayer film; and
providing a first driving device between said first and said second optical multilayer films;
providing a second driving device between said third and said fourth optical multilayer films; and
providing a third driving device between said first and said second substrates.

2. Method of manufacturing a tunable filter comprising:
the steps of forming a first optical multilayer film on a substrate;
forming a plurality of layered composites including sacrificial layers and second optical multilayer films on said first optical multilayer film and a plurality of spring portions respectively connecting each of said second optical multilayer films with said substrate;
removing said sacrificial layers by etching thus to form a gap between adjacent ones among said first and said second optical multilayer films; and
providing a driving device between said adjacent ones among said first and said second optical multilayer films respectively.

* * * * *